March 31, 1959
G. E. SORENSEN
2,879,600
METHOD AND MEANS FOR CENTER DISTANCE MEASURING AND COMPARISON
Filed Jan. 23, 1956
2 Sheets-Sheet 1
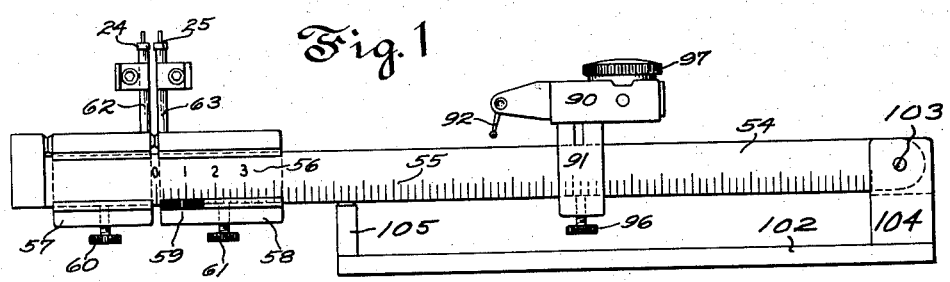
Fig. 1
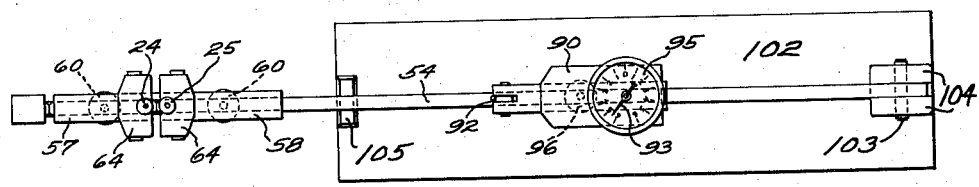
Fig. 2
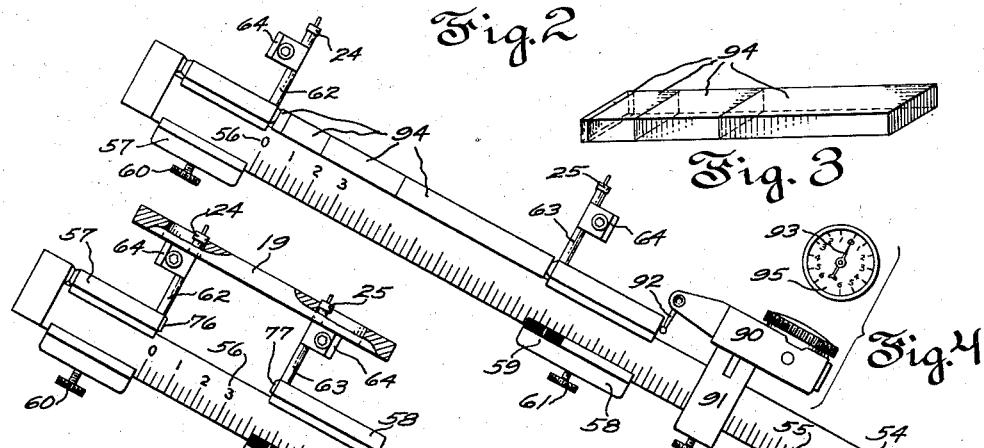
Fig. 3
Fig. 4
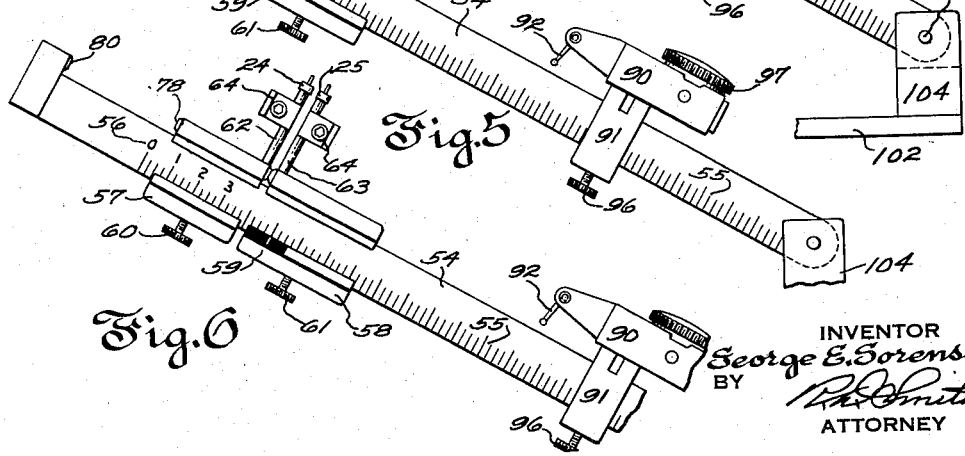
Fig. 5
Fig. 6
INVENTOR
George E. Sorensen,
BY
ATTORNEY March 31, 1959  G. E. SORENSEN  2,879,600
METHOD AND MEANS FOR CENTER DISTANCE
MEASURING AND COMPARISON
Filed Jan. 23, 1956  2 Sheets-Sheet 2
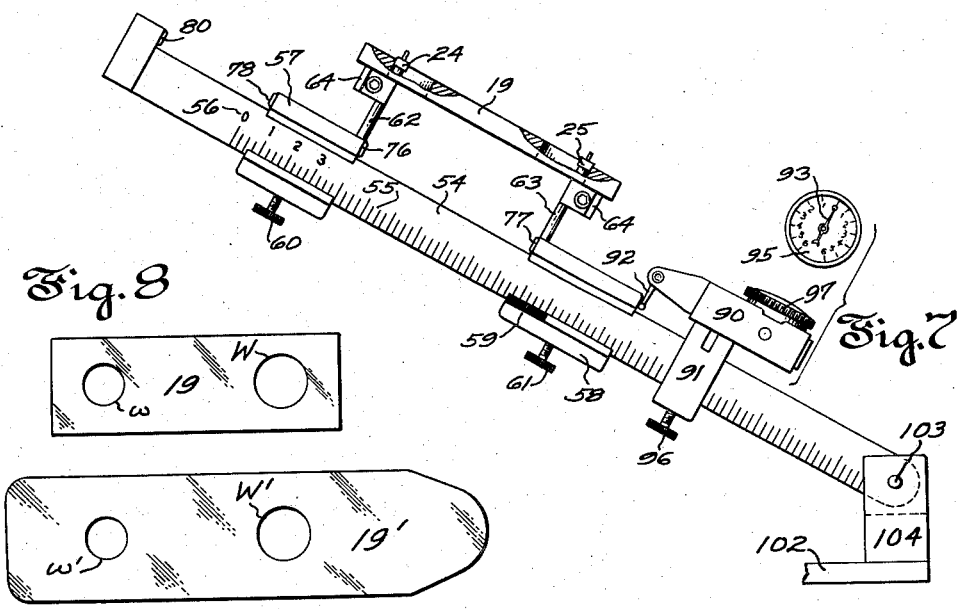
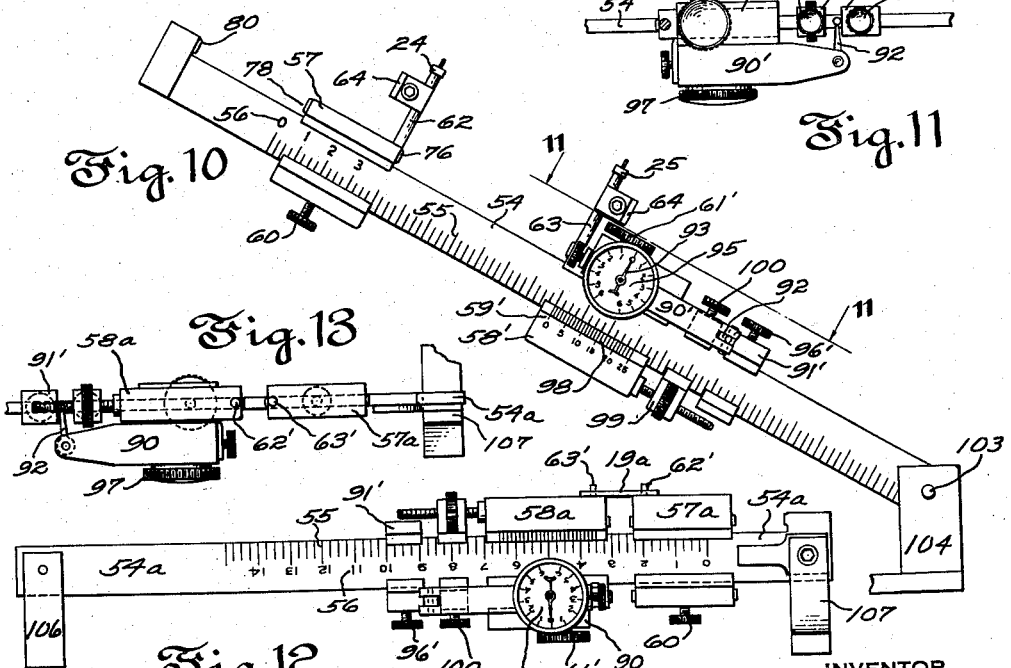
INVENTOR
George E. Sorensen,
BY
ATTORNEY

United States Patent Office 2,879,600
Patented Mar. 31, 1959

2,879,600

METHOD AND MEANS FOR CENTER DISTANCE MEASURING AND COMPARISON

George E. Sorensen, Fairfield, Conn.

Application January 23, 1956, Serial No. 560,691

17 Claims. (Cl. 33—147)

This invention relates to calipering instruments for both measuring and gaging work pieces and particularly to instruments of this kind which afford in their measuring or dimension finding use a direct scale reading of the true measure of distance between points which themselves are not calipered. An instance of such points is the centers of parallel holes in a work piece. The invention also pertains to instruments that can afford in a testing or dimension comparing use a direct scale reading of the differential between two unlike such center distances. In either use the points on the work that are to be calipered may for example be the opposite sides or border walls of round parallel holes.

Previous work in this field is represented in part by my United States Patents Nos. 2,388,582 and 2,677,186, and by several applications for patents now pending in my name including a copending application, Serial No. 354,131, filed May 11, 1953, now U.S. Patent No. 2,774,145 issued December 18, 1956.

In said Patent 2,388,582 a frame stationed dial indicator having an over-and-under graduated style of scale will indicate magnitudes of difference between successively calipered points in the same or different work pieces. Such instrument is equipped with work contacting feelers one of which is movable relatively to the other for successively calipering, say, first the farthest apart and then the nearest together sides of a pair of parallel holes in the same or in different work pieces, or for the similar calipering of first a standard gage and then a work piece to be compared therewith. In a manner fully explained in said Patent No. 2,388,582, and by successive, but not accumulative calipering steps, the deviation of the center distances of different pairs of work holes from a standard dimension for such center distance can be ascertained from computation based on successive readings given by a dial indicator and such computations must be resorted to for finding the true extent of such deviation. The instrument of the patent however is not capable, by means of a single pointer or index in the indicator, of directly indicating the true quantitative value of the net plus-or-minus differential between the uncaliperable center distances of the holes, nor is it capable of indicating in linear units of measure any actual dimension of a single work piece.

My other said Patent No. 2,677,186 discloses a form of beam calipers in which there are two work calipering feelers, both slidable on a frame bar having a half-value graduated scale. A stationary starting graduation of the scale is in register with a slidable index carried by one of the feelers when such feeler abuts against a limit stop on the frame bar which determines a starting point for the caliphering movements of the slidable feelers. This instrument of Patent No. 2,677,186 can directly indicate the true distance between hole centers as a result of successively calipering only the distances between different sides of the holes. But unlike the instrument of Patent No. 2,388,582 it is not a comparator in the sense that it can directly indicate the true differential between unlike center distances of various pairs of holes. Hence it can not indicate directly and without computation the net quantitative value of the plus-or-minus error that characterizes the center distance in a work piece to be tested in relation to a standard center distance in a master gage to which the instrument initially stands adjusted.

A feature possessed in common by the two above mentioned different kinds of instruments is that by calipering successively only distances between different sides of different holes, center distances of the holes in the case of one instrument and a relationship between different center distances of different pairs of holes in the case of the other instrument can quickly be ascertained without knowledge of the sizes or diameters of the holes concerned and regardless of whether the sizes of holes in a work piece to be tested are like the sizes of holes in a master gage with which the work piece is to be compared.

An object of the present invention is to combine in a single instrument the various abilities of performance which heretofore have required separate use of the above mentioned two different kinds of instruments proposed in my two prior patents. The present improvements make it possible by use of one and the same instrument to ascertain by direct reading of the instrument, and without any computation whatever, either the absolute dimension of a center distance or the amount by which one center distance in a work piece to be tested deviates from a standard center distance in accordance with which the instrument can previously be conditioned.

Another object of the invention is, in connection with a center distance measuring instrument as disclosed in my Patent No. 2,677,186, to employ a dial indicator to increase the accuracy of reading of the measurement indicating position of a movable index mark in register with a scale of graduations.

These and other objects of the improvements will appear in greater particular in connection with the following description of preferred embodiments of the invention, in which description reference is had to the following drawings wherein:

Fig. 1 is a view in elevation showing my combined distance measuring and center distance comparing instrument conveniently supported on a base bracket for bench use in a tool department, the slidable work calipering jaws being in starting position along the frame beam.

Fig. 2 is a plan view of the instrument with parts positioned as in Figure 1.

Fig. 3 shows an assortment of assembled spacer blocks that can be employed to set up a standard dimension for center distance in the instrument of Figs. 1 and 2 when it is to be used as a comparator for testing accuracy of work pieces.

Figs. 4, 5, 6 and 7 show the parts of the instrument of Figs. 1 and 2 variously adjusted manually in carrying out successive work calipering steps performed by use of the instrument.

Fig. 8 shows in plan view a master gage containing two holes to be calipered for conditioning the instrument to use as a comparator.

Fig. 9 shows a work piece containing corresponding holes, the error of whose center spacing as compared with a standard center spacing of the holes in the master gage is to be indicated by use of the instrument according to the invention.

Fig. 10 shows a modification of the instrument wherein the dial indicator is slidable along the scale beam instead of stationary thereon in the test reading of the instrument.

Fig. 11 is a plan view of a portion of the modified instrument of Fig. 10 seen in the direction of the arrows from the plane 11—11.

Figs. 12 and 13 correspondingly show a modification of the instrument suited for holding in the hands during use.

Patent No. 2,677,186 explains in detail several ways in which an instrument of the general nature shown herein can be used to give a direct scale reading on the instrument of the distance between centers of two parallel holes, such as are herein shown in the master gage of Fig. 8, merely by successively calipering different distances between various side walls of the holes. A brief review of the construction and method involved in the use of this kind of instrument for measuring or ascertaining center distance follows.

The frame beam 54 of the instrument carries a scale of graduations 55 designated by indicia or numerical characters 56 which in the use of the instrument for center distance measuring need be half-value designations of the actual distance of the characters from the location of the lower or "zero" end of the scale. Two independently slidable jaws 57, 58 are carried on beam 54. 59 designates an index marked carried by the jaw 58. Each jaw has a spring gib (not shown) under binder screw 60 or 61 which may be regarded as conventional. The jaws carry upstanding work calipering feelers 62 and 63 respectively which are equipped near their upwardly directed free ends with work sensing terminals 24, 25 respectively. The bodily portions of jaws 57 and 58 are prevented from coming fully into mutual contact by projecting studs 76 and 77 fixed respectively on the jaws. A similar projecting stud 78 is fixed on the opposite or left side of jaw 57 and projects from the latter for abutment against a stop lug 80 fixed on the scale beam 54.

The index mark 59 is initially in register with a beginning point on the scale 55 whose position reads on the scale as the true distance between the axial centers of terminals 24, 25 when the parts are in starting position shown in Figs. 1 and 2, although the actual distance then existing from the index mark to the location of the zero end of the scale will then be twice the said true distance between centers of the feelers.

In the use of this instrument for measuring center distances as described in Patent No. 2,677,186 there is first calipered, say, the nearest together sides of two parallel holes (W, w) in the master gage 19 by sliding jaw 58 away from jaw 57 and fixing it in such position on the scale beam that the work sensing terminals 24, 25 on the respective legs 62, 63 contact the nearest together sides of holes (W, w) in the master gage as shown in Fig. 5. The gage may for convenience rest on shelf brackets 64 carried by legs 62, 63 respectively and adjustable lengthwise thereof. The gage is then removed and jaws 57, 58 are again brought into mutual abutment by sliding jaw 57 from its position shown in Fig. 1 to its position shown in Fig. 6 where jaw 57 is again fixed on scale beam 54 by means of its thumb screw 60. Jaw 58 is then released and moved to the right for calipering the farthest apart sides of the same holes (W, w) as shown in Fig. 7. Patent No. 2,677,186 fully explains how this will cause the index mark 59 to register with a graduation on the half-value scale 55 which denotes the true measure of distance between the hole centers and avoids the need for computation.

The present invention adds to the instrument of Patent No. 2,677,186 a dial indicator 90 arranged in a manner to cooperate with the slidable instrument jaw 58 in such way that the instrument newly becomes usable as a comparator for testing the accuracy of work pieces by indicating within the capacity of the dial scale the net quantitative value of the plus-or-minus error, if any, in the center distance of parallel holes in the work piece. It enables such test to be made quickly without computation and even without knowledge by the instrument user as to what is the correct or standard dimension of the center distance being tested in terms of units of measurement. The test operator in using my improved instrument has only to caliper the work in two successive steps and then read directly on the scale of the indicator dial the net plus-or-minus quantitative value of the error by which the center distance in a work piece being tested fails to meet a preestablished standard selectively set up in the instrument.

Thus the present improvements enable the center distance measuring instrument of Patent 2,677,186 to serve the added purpose of comparing different center distances as does the instrument of Patent 2,388,582, but with the important advantage over the latter that no computation need follow the direct reading of a single swingable pointer against the scale in the dial indicator. By means of the present invention a single swingable pointer, as a result of two successive calipering operations, is brought into register with a graduation on the over-and-under scale of the dial indicator that is denominated as the true quantitative net value of the plus or minus error in the center distance being tested.

This result could not be had by merely combining the dial indicator of Patent 2,388,582 with the beam calipering instrument of Patent 2,677,186 because in the latter instrument the manner of calipering involves successively moving the calipering jaw 58 accumulative amounts relatively to the frame of the instrument in the course of two successive calipering operations of the same pair of holes. But in the comparator of Patent No. 2,388,582 the movement of the work calipering feeler relatively to the frame of the instrument is only that extent necessary to shift the feelers from contact with the nearest together sides of a pair of holes into contact with the farthest apart sides of the same holes.

The problem posed by these different characteristics of operation of my two former instruments is solved in this invention by providing the dial indicator with graduations denominated as half-values, rather than true values, of the actual distances of movement of the work sensing feeler 25 relative to the instrument frame or scale beam in the course of calipering the work. In other words the dial indicator is so calibrated that the degree of movement of its single pointer, when responsive to an extent of movement of the work calipering feeler 25 along the scale beam, is such that only the final portion of said extent of feeler movement causes the pointer to sweep over the dial scale to a graduation that is denominated as a distance equal to only half the actual extent of feeler movement effective on the indicator.

In its use as a comparator my improved instrument, incorporating this new kind of dial indicator, will first be manipulated as hereinbefore described for measuring the standard center distance of two holes (W, w) in the master gage 19 of Fig. 8. This sets up in the instrument a position of the slidable calipering jaw 58 that accords with the accurate measurement of such center distance that is to be used as a standard.

While the jaw 58 is thus established in its ultimate measuring position shown in Fig. 7 the bracket or settable member 91 for mounting the over-and-under indicator 90, and the indicator with it, can be shifted bodily along scale beam 54 toward jaw 58 until pressure of the ball terminal of the sensing member herein illustrated for example as an arm 92 of the indicator against its point of contact with jaw 58 swings the sensing arm from its normal spring urged leftward inclined position in Fig. 1 into substantially perpendicular relation to the long straight edge of the scale beam as shown in Fig. 7. This is herein sometimes referred to as the target position of the indicator on the beam because then, as shown in Fig. 7, the pointer 93 of the dial indicator should register exactly with "zero" on the half-value graduated scale of the indicator dial. It will be a convenience in bringing the dial pointer into exact register with "zero" on the dial scale if the dial 95 is provided with a rotary mounting in the body of the indicator that permits it to be swiveled adjustably to a finely controlled degree by means of an externally accessible ferrule 97 while the pointer 93 stands still, as is the case with the indicator dial of my aforesaid copending application Serial No. 354,131 and more conventional dial indicators. Mounting bracket 91 is releasably fastened to beam 54 by means of its set screw 96.

After the dial indicator has thus bodily been stationed in its target position in fixed relation to the scale beam, the master gage 19 can be removed and the jaws 57, 58 returned to their starting position shown in Figs. 1 and 2. The three successive stepping-off movements of the jaws 57, 58 along the scale beam will then be repeated, this time in the course of calipering a work piece 19' that is to be compared with the master gage 19.

If the center distance of the holes in the work piece exactly accords with that of the holes in the master gage, the ultimate position of jaw 58, after the two successive calipering operations, will result in the pointer of the dial indicator again registering exactly with "zero" on the dial scale. But if the center distance in the work piece is erroneous, either because exceeding or falling short of the standard center distance to which the dial indicator stands adjusted, the single pointer 93 in the dial indicator will be found displaced to the left or negative side from "zero" to indicate an error of shortness, or will be found displaced to the right or positive side from "zero" to indicate an error of overlength. In either instance the single indicator pointer 93 will be found to register with either a plus or a minus graduation of the half-value over-and-under scale of dial 95 that is denominated the exact number of units of measurement by which the center distance in the work piece deviates from the standard center distance to which the dial indicator was originally oriented on the frame beam.

In place of conditioning the instrument by initially calipering two holes in a master gage, I may employ space blocks 94 of accurate known standard lengths in the following manner.

Assuming that a shop drawing specifies 3.000 inches as the correct distance between the centers of the two holes W', w' in the work piece 19' with a tolerance or permissible variation of .002 inch above and below the correct figure, the instrument may be conditioned for testing the accuracy of the work piece by setting the dial indicator so that its pointer will register zero if the center distance of the holes in the work piece is exactly 3.000 inches.

The scale 55, as marked on beam 54 herein, assumes a distance of 1¾₁₆" between the centers of feeler legs 62, 63 in Figs. 1 and 2 wherefore the index mark 59 in said figures is removed from the zero graduation by a distance of 1⅝" while in register with a graduation of the scale that is denominated 1¾₁₆" by the indicia 56 but in Fig. 4 for simplicity of computation the distance between the centers of feeler legs 62, 63 when jaws 57 and 58 abut each other is assumed to be .240" instead of 1¾₁₆".

In using the space blocks 94 of Fig. 3 for determining the target position in which the indicator is to be established it must be considered that any given instrument possesses a constant dimension as the exact distance between the width centers of the two feeler legs 62, 63 when the contact studs 76, 77 abut against each other as in Figs. 1, 2 and 6. Assuming that such constant is .240 inch in the present instance, this constant will be subtracted from the aforesaid accurate zero setting value of 3.000 inches. The remainder, 2.760 inches, is to be multiplied by two to bring said remainder value into accordance with the half-value graduated scale 56 as hereinbefore explained. The product of such multiplication is 5.520 inches. Hence there will be selected and assembled together in end-to-end relation standard blocks 94, as shown in Fig. 3, whose combined lengths total 5.520 inches.

Jaw 57 is then moved against the stop lug 80 on beam 54 and its thumb screw 60 is tightened to lock the jaw in this position. The standard blocks 94 are then placed on the top edge of beam 54 between the contact studs 76, 77 on jaws 57, 58, and jaw 58 is brought up toward the left to clamp the standard blocks lightly against jaw 57. In this position jaw 58 is fixed on beam 54 by tightening its binder screw 61.

As in the first example of conditioning the instrument to a standard dimension by use of the master gage 19 as shown in Figs. 5, 6 and 7, jaw 58 is thus established in a standard measuring position shown in Fig. 4. As before, the mounting bracket 91 of the dial indicator 90 and the dial indicator with it are then shifted bodily along scale beam 54 to the left toward jaw 58 until pressure of the ball terminal of sensing member or arm 92 of the indicator against its point of contact with jaw 58 swings the sensing arm 92 from its normal, spring urged, leftward inclined position in Fig. 1 into substantially perpendicular relation to the long straight edge of the scale beam as shown in Fig. 4. Then the pointer 93 of the dial indicator should be made to register exactly with "zero" on the half-value graduated over-and-under scale of the indicator dial. With this done, work pieces 19' can successively be tested as to accuracy of center distance between the holes W', w' just as hereinbefore has been described.

In Figs. 10 and 11, the construction of the instrument is shown to be modified by mounting the dial indicator 90' on the jaw 58' with its sensing arm 92 disposed to come into contact with an abutment 91' that is slidable along and releasably fastenable to the frame beam 54 by means of its set screw 96'. This does not alter the manner of operation other than that the sensing arm 92 of the dial indicator 90' is carried in unison with jaw 58' instead of being stationed on the beam 54 while jaw 58' approaches it.

Fig. 11 further shows the jaw 58' equipped with a conventional vernier scale 98, associated with an anchoring clamp 99 in conventional manner.

In all forms of the instrument hereinbefore described the end of bar 54 opposite the stop 80 is hinged on a pivot pin 103 lodged in the forked upper end of a bearing bracket 104 on a base structure 102. The spaced arms of forked bracket 104 are closed so tightly toward the opposite faces of bar 54 that the latter maintains various inclined positions to which it may be set for best convenience in placing light work pieces such as 19' on the feeler brackets 64, and for calipering them by sensing movement of the slidable jaws 57, 58, and for reading the face of the dial indicator 90. When preferred, the bottom edge of bar 54 can be lowered to rest on a support 105 upstanding from the base 102 to better stabilize the bar in horizontal position.

Figs. 12 and 13 show a modification in arrangement of the elements appearing in Figs. 10 and 11 to make the instrument of those figures more convenient for use as a hand held and hand maneuvered device in contrast to using it without removing the instrument from its resting position on a bench or table surface. Also in Figs. 12 and 13 it will be observed that the calipering feelers or longish legs 62, 63 are replaced by relatively tiny upstanding calipering pins 62' and 63' which are adapted to engage with and sense a relatively small thin and flat work piece 19a that spans the space between and rests directly on the top surfaces of jaws 57a and 58a. Also in Figs. 12 and 13 the scale beam 54a is equipped with a depending support post 106 fixed to its left end and with a support stand 107 at its right end having sufficient base extent crosswise of the beam to support the latter stably when post 106 and stand 107 are set upon a table top or bench. The position setting screws 60, 61', 96' and 100 and the indicator 90 are lower than the scale beam to clear the top edges of jaws 57a and 58a to receive the work piece. Also the indicia 56 of scale graduations 55 appear upside down and progressing in value from right to left in order that when the instrument is picked up in the hands of the operator and maneuvered to sight the reading of the indicator as hereinafter described the indicia will appear right side up and progress in value from left to right.

For purpose of use while held in the hands of the operator the instrument of Figs. 12 and 13 can rest on a table top while calipering steps such as those hereinbefore explained are performed on the small and light weight work piece 19a. Following the final calipering step the set screw 61' will be tightened, and the work piece being testing can then be lifted away from the calipering pins 62' and 63' to leave the instrument clear for sighting the reading.

The reading is sighted by an operator assumed to be standing at the rear of the instrument as viewed in Fig. 12 and facing the viewer. He has calipered the work piece while standing in that relation to the instrument. Thus when he picks up the instrument to observe the reading of the dial indicator or of the vernier he will tip the top edge of the scale beam toward himself bringing the indicia 56 and the over-and-under scale of the indicator in right-side-up relation to his point of view whereupon he will sight past the five interpolative or vernier graduations 98 and along the graduations 56 crosswise the scale beam. At the same time the indicator pointer 93 will be fully and clearly in his view so that either a dimensional measurement reading can be taken from the registration of the vernier with the beam scale or an over-and-under reading of dimension comparison can be taken from the indicator.

Regardless of many variations in form of instrument or measuring and stepping off apparatus which may be used as an aid in practicing the invention, there are basic principles of method which characterize all such use. Expressed in terms of method, the sensing of the master gage 19 or of the work piece 19' as in Figs. 5 and 7 constitutes first and second calipering steps while the accompanying sliding movement of the jaws 57, 58 constitute accumulative stepping off on beam 54 of the distances that are calipered by the work sensing feelers 24, 25 of the legs 62, 63. Such stepping off might be done by means of machinist's dividers or measuring tape for arriving at the location of the jaw 58 on beam 54 in Fig. 7 to which location of the jaw the dial indicator 90 is sensitive in the manner hereinbefore explained.

Whereas indicators such as 90 are commonly termed "dial" indicators, and indicator 90 is sometimes so referred to herein, it is not necessary that the graduated face or "dial" of such instruments be fully circular. Instead it can be segmental or sectoral. Also the pointer 93 need not be encased. Also it is conventional in the simpler forms of indicators that can be used in the practice of this invention for the sensing arm 92 to be united with the pointer 93 so as to swing on a common pivot therewith, the sensing arm then having a much shorter radial length than the pointer for multiplying the ratio of linear distance moved by the pointer to the linear distance moved by the sensing arm. Also the indicator need not have a swingable sensing arm but instead may have a plunger type of senser.

For attaining exact initial alignment of the indicator pointer with the "zero" graduation of the indicator scale the scale need not be adjustable if means for adjustment is incorporated in the senser, as in the indicators of the aforesaid U.S. patent, No. 2,388,582 and copending application, Serial No. 354,131, filed May 11, 1953, all as well understood in the art.

The appended claims are therefore directed to the method above referred to as well as to the particular style of instrument herein chosen to illustrate mechanical means that are suited to carrying out the method.

I claim:

1. The method of ascertaining without computation the measure of difference between an unmeasurable spacing of hole centers in a work piece and a standard dimension with which said center spacing if accurate should accord, which includes the steps of, calipering a first distance between boundaries of respectively different master holes whose center spacing equals said standard dimension along a line intersecting the center axes of the holes, spacing of said first distance from a starting point on a measurement accumulating beam, calipering a second distance along said line between opposite boundaries of said holes, spacing off said second distance along said beam to arrive at a location on said beam separated from said starting point by the sum of said first and second distances, and disposing an over-and-under indicator in a target location on said beam to be sensitively responsive in said location to the spacing off of said second distance in a manner to register "zero" when said sum of said first and second distances equals said standard dimension; wherefore if repetition of said calipering and spacing off steps with respect to a pair of work holes to be tested arrives on said beam at a point displaced from said location said indicator will thereby be caused to register a measure of difference between said standard dimension and the center spacing of said work holes.

2. The method defined in claim 1, in which the said step of spacing off the said second distance actuates the said indicator.

3. The method defined in claim 1, in which the said pointer of the said indicator when displaced from register with "zero" by the said spacing off of the said second distance registers one half the actual portion of the said second distance to which said indicator is sensitively responsive.

4. The method defined in claim 1, in which a master gage having holes of accurate known center spacing is first calipered twice as described in claim 1, and a work piece having holes of unknown center spacing is subsequently calipered twice as described in said claim.

5. The method defined in claim 1, in which the said over-and-under indicator is disposed on the said beam in its said target position therealong by interposing at least one spacing block of predetermined length between said indicator and the said starting point on said beam.

6. An instrument for comparing work center spacing with a standard dimension, embodying in combination, a straight frame beam, a first calipering jaw carrying in fixed relation thereto a first work sensing feeler and slidably engaged with said beam, a second calipering jaw carrying in fixed relation thereto a second work sensing feeler and slidably engaged with said beam for movement into and away from abutting engagement with said first jaw for calipering work, an indicator mechanically associated with said beam and with said second calipering jaw having a sensing member disposed to be actuated by a partial extent of the sliding movement of said second calipering jaw along said beam, a pointer movable in said indicator mechanically connected with said sensing member to be moved in proportion to jaw-caused movement of said member, and a testing scale of graduations positioned in said indicator to be swept by said pointer, said graduations ranging serially away from a "zero" graduation and being denominated as units of distance equal to one half the distances of said partial extent of sliding movement of said second jaw that actuates said sensing member.

7. An instrument as defined in claim 6, in which the said denominated graduations on the said dial face range serially in both directions away from said "zero" graduation whereby to give a quantitative plus or minus reading of any error in work center spacing.

8. In instrument as defined in claim 6, in which the said indicator is adjustably stationed on the said beam in a manner to present its said sensing member for actuation by the said second calipering jaw during only the said partial extent of sliding movement of the latter.

9. An instrument as defined in claim 8, together with a stop fixed on the said beam at the remote side of the said calipering jaws from the said indicator engageable by the said first calipering jaw in a manner to limit the distance of separation of both of said jaws from said indicator.

10. An instrument as defined in claim 8, in which the said work sensing feelers upstand respectively from the said calipering jaws, and the said scale of graduations is upside down.

11. An instrument as defined in claim 8, in which one end of the said beam is pivotally supported to enable said beam and said work sensing feelers to be stationed in various tilted positions.

12. An instrument as defined in claim 10, together with supporting surfaces in fixed relation to the said work sensing feelers in position to underlie and support a work piece being sensed by said feelers and in a manner enabling said work piece to slide relatively to said surfaces in the direction of work sensing movement of said feelers as conveyed by the said jaws.

13. An instrument as defined in claim 6, in which the said indicator is carried by the said second jaw, together with an abutment adjustably stationed on the beam in the path of movement of the said sensing member as conveyed by said second jaw thereby to be actuated by the said partial extent of sliding movement of said second jaw.

14. An instrument as defined in claim 13, together with a stop fixed on the said beam at the remote side of the said calipering jaws from the said abutment engageable by the said first calipering jaw in a manner to limit the distance of separation of both of said jaws from said indicator.

15. An instrument as defined in claim 13, together with a straight scale of graduations denoting linear measurement extending lengthwise of said beam on a laterally disposed face thereof, the said testing scale of graduations facing in the same lateral direction as said straight scale of graduations with respect to said beam.

16. An instrument as defined in claim 15, together with a vernier device connected with the said second calipering jaw including a set of vernier graduations carried by said jaw and displayed in the said same lateral direction with respect to said beam.

17. An instrument for both measuring the dimensions of work pieces and gauging the accuracy of dimensions in different work pieces comprising, a straight frame beam carrying a scale of graduations whose range extends from minimum to maximum dimensional denominations, a first calipering jaw carrying in fixed relation thereto a first work sensing feeler, a settable member slidably engaged with said beam having means to station said member in various fixed positions to which it is shiftable along the beam, a second jaw member carrying an index disposed to register with said graduations for exhibiting the dimensions of a work piece and carrying in fixed relation thereto a second work sensing feeler, said second jaw member being slidably engaged with said beam between said settable member and said calipering jaw and free for movement throughout said range of graduations while said settable member remains stationed in fixed position on said beam, an indicator carried by one of said members having a sensing member contactable by the other of said members in a manner to be actuated by a partial extent of the sliding movement of said second jaw member along said beam, a pointer movable in said indicator mechanically connected with said sensing member to be moved in proportion to the movement thereof for gauging the accuracy of dimensions of different work pieces, and a scale of error-indicating graduations positioned in said indicator to be swept by said pointer.

References Cited in the file of this patent
UNITED STATES PATENTS

| | | |
|---|---|---|
| 2,388,582 | Sorensen | Nov. 6, 1945 |
| 2,447,612 | Dowe | Aug. 24, 1948 |
| 2,677,186 | Sorensen | May 4, 1954 |
| 2,685,136 | Imshaug | Aug. 3, 1954 |
| 2,774,145 | Sorensen | Dec. 18, 1956 |